(12) United States Patent
Vander Sluis et al.

(10) Patent No.: US 10,391,950 B2
(45) Date of Patent: Aug. 27, 2019

(54) STOWABLE DOCKING MODULE

(71) Applicant: FAURECIA INTERIOR SYSTEMS, INC., Auburn Hills, MI (US)

(72) Inventors: Daniel Vander Sluis, Rochester Hills, MI (US); Erin Laurain, Romeo, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 316 days.

(21) Appl. No.: 15/394,913

(22) Filed: Dec. 30, 2016

(65) Prior Publication Data

US 2018/0186301 A1      Jul. 5, 2018

(51) Int. Cl.
| | |
|---|---|
| *G06F 1/16* | (2006.01) |
| *B60R 11/02* | (2006.01) |
| *B60R 11/00* | (2006.01) |

(52) U.S. Cl.
CPC ....... *B60R 11/02* (2013.01); *B60R 2011/0003* (2013.01); *B60R 2011/0082* (2013.01); *B60R 2011/0089* (2013.01)

(58) Field of Classification Search
CPC ....................... B60R 2011/0075; G06F 1/1632
USPC .................................. 361/679.01; 296/37.12
See application file for complete search history.

(56) References Cited

U.S. PATENT DOCUMENTS

| | | | | |
|---|---|---|---|---|
| 6,754,070 B2* | 6/2004 | Chen | ....................... | B60R 11/02 248/27.1 |
| 7,506,843 B2* | 3/2009 | McKelvey | .............. | B60R 11/02 224/483 |
| 8,708,296 B2* | 4/2014 | Nemoto | ................... | B60R 11/02 248/316.4 |
| 8,807,621 B2* | 8/2014 | Stephan | .................... | B60R 7/06 296/37.12 |
| 8,910,990 B1* | 12/2014 | Oldani | .................... | B60R 11/02 220/260 |
| 9,014,393 B2* | 4/2015 | Huh | ........................ | B60R 11/02 381/386 |
| 9,163,779 B2 | 10/2015 | Funk et al. | | |
| 9,446,720 B1* | 9/2016 | Prazeres | ............. | B60R 11/0258 |
| 10,086,771 B2* | 10/2018 | Barre | ...................... | B60R 11/02 |
| 10,155,483 B2* | 12/2018 | Catlin | ................. | B60R 11/0241 |

(Continued)

FOREIGN PATENT DOCUMENTS

WO           02085672 A1        10/2002

*Primary Examiner* — Anthony Q Edwards
(74) *Attorney, Agent, or Firm* — LKGlobal | Lorenz & Kopf, LLP

(57) ABSTRACT

A stowable docking module includes a translation housing received within a housing sub-assembly for translation between a first, stowed position and a second, deployed position. A docking station sub-assembly is mounted to the translation housing and is pivotably mounted to the translation housing to pivot between a stowed position and a deployed position. The docking station sub-assembly includes a first hook member having a first gripping position and a second gripping position. The first hook member is moveable on the docking station between the first gripping position and the second gripping position. A second hook member is secured to the docking station and arranged to oppose the first hook member. An electronic device may be docked in the stowable docking module by securing the device between the first hook member and the second hook member.

18 Claims, 8 Drawing Sheets

(56) References Cited

U.S. PATENT DOCUMENTS

| | | | |
|---|---|---|---|
| 2011/0259789 A1* | 10/2011 | Fan | B60R 11/0258 206/701 |
| 2014/0339847 A1* | 11/2014 | Brunard | B60R 11/02 296/37.12 |
| 2014/0354002 A1* | 12/2014 | Bisceglia | B60R 11/02 296/37.12 |
| 2015/0343962 A1 | 12/2015 | Le Leizour et al. | |
| 2016/0257260 A1* | 9/2016 | Barre | B60R 11/02 |

* cited by examiner

STOWABLE DOCKING MODULE

TECHNICAL FIELD

The technical field relates generally to interior stowage arrangements for motor vehicles, and more particularly to a docking module movable between a stowed position and a deployed position, the docking module being further adapted to receive a smartphone, tablet or similar personal electronic device when in the deployed position.

BACKGROUND

Personal computing devices, such as smart phones, tablet computers, and the like are ubiquitous and powerful personal accessories. The computing power and functionality of these devices permit users to be entertained with music and/or video; play games; remain connected to friends and colleagues via voice, text and video messages, email and more; surf the internet; track personal physical activity; navigate to and from various locations by virtually any mode of transportation and much more.

Vehicle designers, and especially designers of personal passenger vehicles are challenged to introduce new electronic features and functions for the operators and passengers of the vehicle. Collectively, these features and functions are often referred as infomatics or infotainments systems, and the features and functions of these systems may also be combined into a class of in-vehicle electronic features and functions known as telematics.

As the expected useful life of a passenger vehicle is ten (10) or more years, while the life-cycle of consumer electronic devices is on the order of six (6) to eighteen (18) months, the further challenge to the vehicle designer is keeping vehicle infotainment systems current with consumer electronics trends and desired features. Designers have recognized that instead of trying to keep integrated vehicle electronics current, it is possible to allow the vehicle operator or occupants to link smart devices into the vehicle, and to utilize the capabilities of the smart devices to remain current as to technology and to provide the most recent entertainment, navigation and other features or functions.

Personal smart devices are inherently portable, and the vehicle operator and/or occupants will bring them into and take them from the vehicle. Therefore, these devices when used within the vehicle are best securely docked within the vehicle. Moreover, in contrast to being or appearing as an add-on structure, in-vehicle electronic device docking systems should be aesthetically and functionally integrated into the vehicle interior and capable of accepting a wide variety of electronic devices.

BRIEF SUMMARY

In a non-limiting embodiment, a stowable docking module includes a translation housing received within a housing sub-assembly for translation between a first, stowed position and a second, deployed position. A docking station sub-assembly is pivotably mounted to the translation housing so as to be pivotable between a stowed position when the translation housing is in the first, stowed position and a deployed position, different than the stowed position, when the translation housing is in the second, deployed position. The docking station sub-assembly includes a first hook member having a first gripping position and a second gripping position. The first hook member is moveable on the docking station between the first gripping position and the second gripping position, with the second gripping position allowing for the acceptance of larger sized electronic devices. A second hook member is secured to the docking station and arranged to oppose the first hook member. An electronic device may be docked in the stowable docking module by securing the device between the first hook member and the second hook member.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to vehicle stowage arrangements, and in particular to a stowable docking module configured to allow a vehicle operator or occupant to secure or dock a portable electronic device within the vehicle during use of the vehicle and with the docking station sub-assembly deployed. The docking station sub-assembly may be stowed when not required for docking an electronic device.

Figure 1:
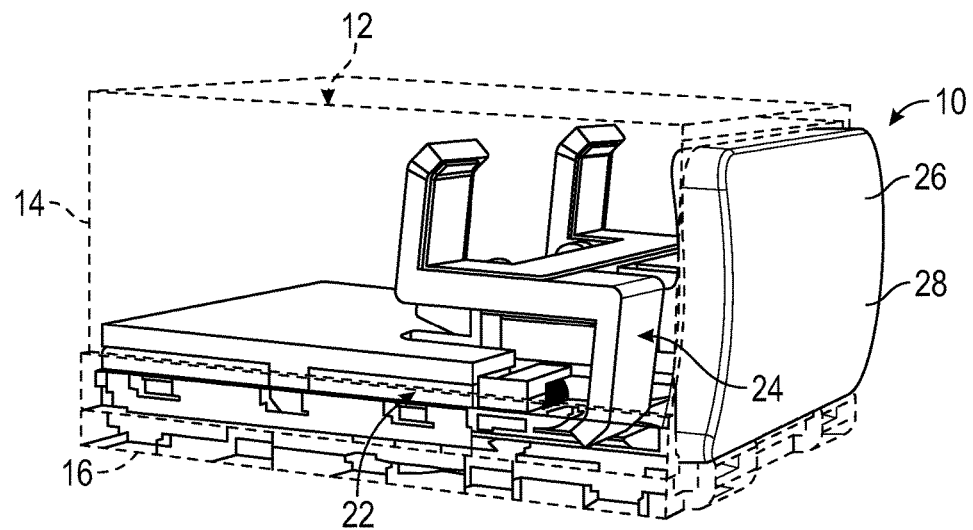
FIGS. 1-3 illustrate a stowable docking module in accordance with various of the herein described exemplary embodiments showing a docking station sub-assembly being translated from a first, stowed position to a second deployed position.
Figure 2:
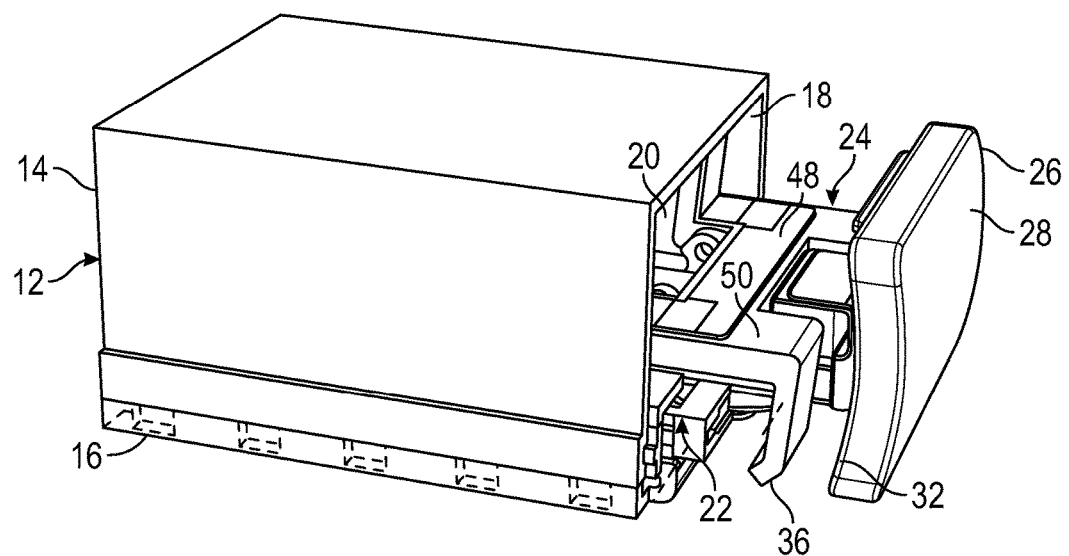
Figure 3:
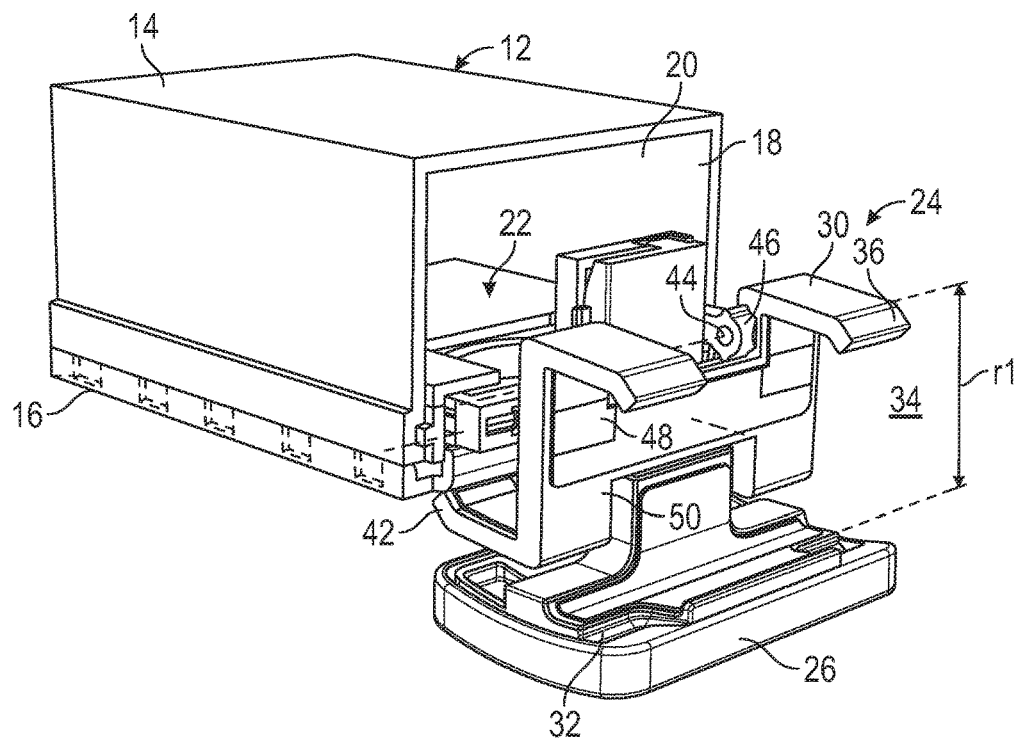

FIGS. 1-3 depict a stowable docking module 10 in accordance with the herein described embodiments. FIGS. 1-3 depict the module 10 including a housing sub-assembly 12 having a first housing portion 14 and a second housing portion 16 secured to the first housing portion 14 forming an enclosure with an opening 18 and an interior space 20 accessed via the opening 18. Operably disposed within the interior space 20, when in a first, stowed position (see, FIG. 1) and at least partially extending from the interior space 20 when in a second, deployed position (see, FIG. 3) are a translation housing 22 and a docking station sub-assembly 24. Optional is a decorative closure panel 26 with a show surface 28. The show surface 28 may be provided with a finish, color and texture to coordinate with an overall aesthetic theme of a vehicle interior (not depicted) into which the module 10 is fitted.

FIG. 1 depicts the translation housing 22 and the docking station sub-assembly 24 fully in a first, stowed position. The translation housing 22 is received within the interior space 20, and the docking station sub-assembly 24 is rotated into a first, stowed position where it is rotated and adjacent, substantially parallel with the translation housing 22. FIG. 2 illustrates the translation housing 22 and the docking station sub-assembly 24 in an intermediate position between the first, stowed position and a second, deployed position, which is shown in FIG. 3. In the second, deployed position depicted in FIG. 3, the docking station sub-assembly 24 is extended outwardly from the interior space 28, and it is rotated to a second, deployed position. As depicted in FIG. 3, the docking station sub-assembly rotates relative to the translation housing 22 and forms an approximately 90° angle thereto. It will be appreciated that the docking station sub-assembly 24 may be caused to rotate through any suitable angular range in any suitable direction to achieve an operable orientation to the translation housing 22 and within the vehicle.

The docking station sub-assembly 24 includes a first hook member 30 and an opposing second hook member 32. The panel 26 is secured to the second hook member 32. It will be appreciated that the panel 26 and second hook member 32 may be designed as a singular member. An electronic device docking space 34 is defined between the first hook member 30 and the second hook member 32, and in use, an electronic device (not depicted) may be docked within the docking station sub-assembly 24 and retained between the first hook member 30 and the second hook member 32 within the docking space 34.

Figure 4:
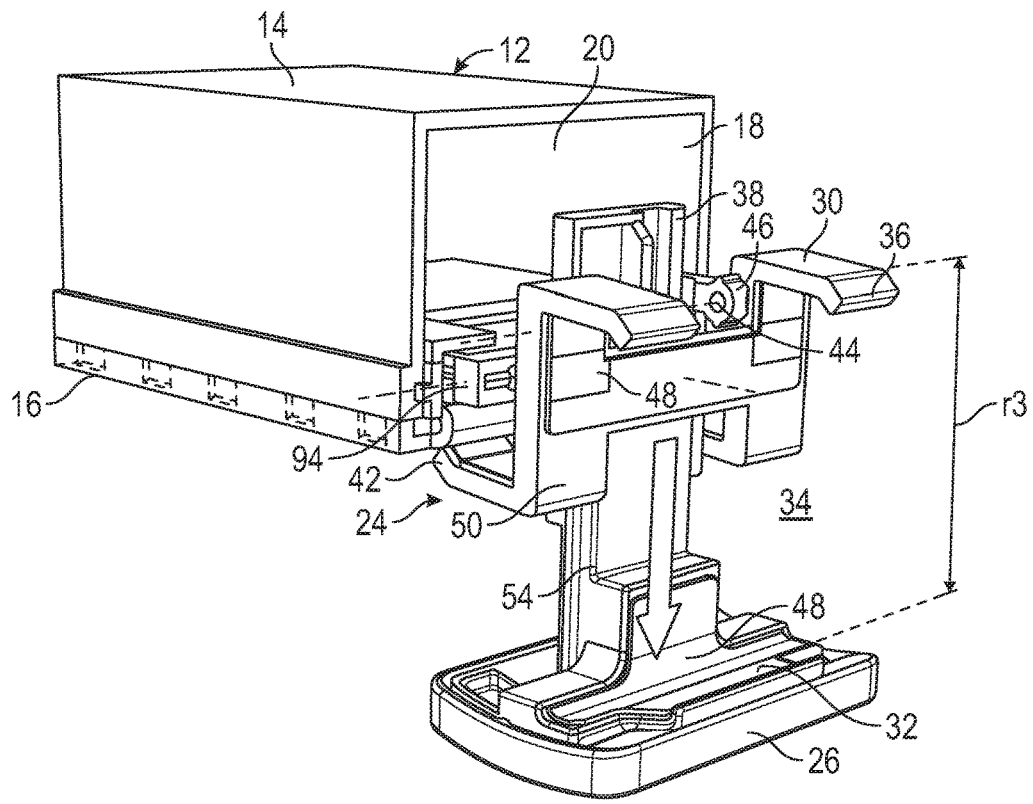
FIGS. 4-6 illustrate the stowable docking module shown in FIGS. 1-3 with the docking station sub-assembly in the second, deployed position and further illustrating first and second gripping positions of a first hook member in accordance with the herein described embodiments.
Figure 5:
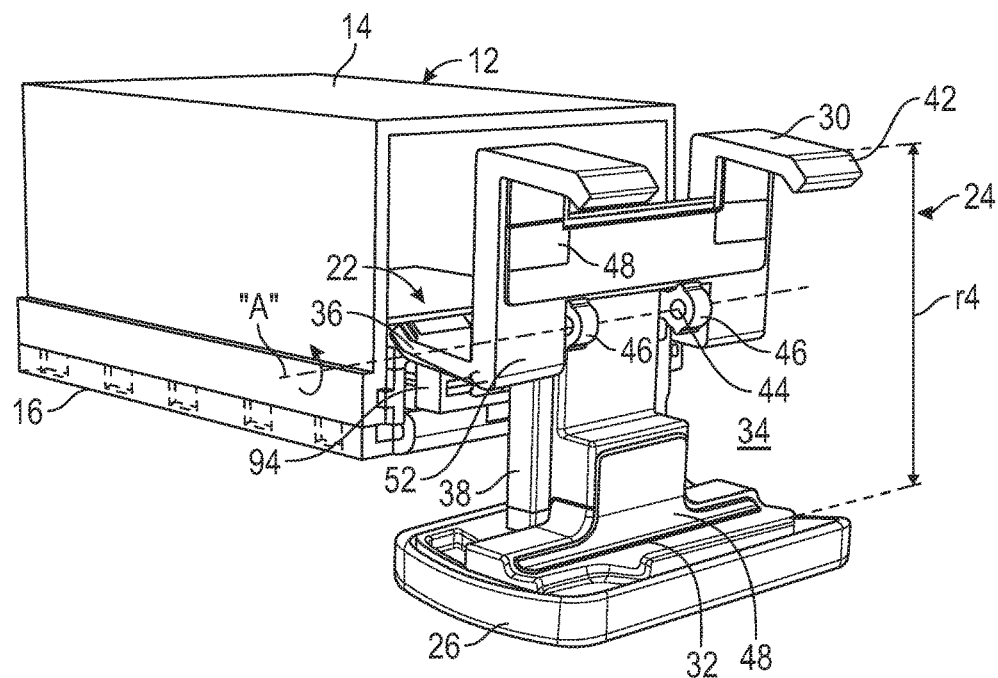
Figure 6:
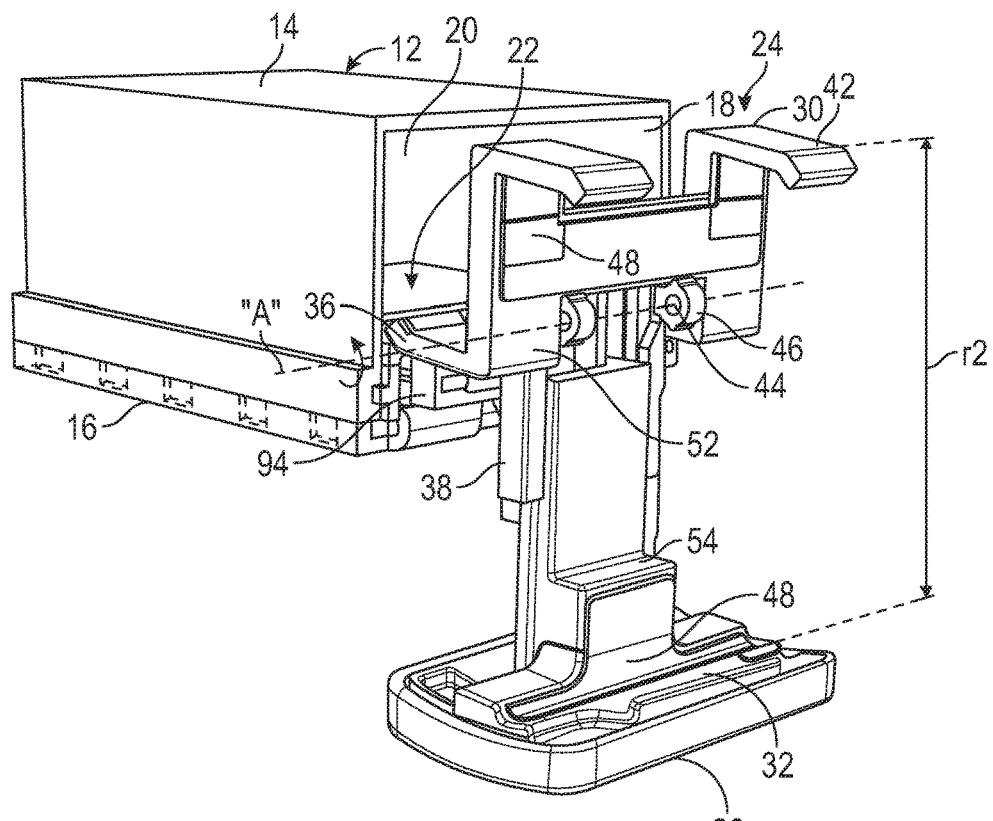

With continuing reference to FIG. 3 and reference now also to FIGS. 4-6, the stowable docking module 10, and in particular the docking station sub-assembly 24 is adaptable to receive electronic devices having a wide range of sizes, and in particular widths or heights. To effect this capability, the docking space 34 is made to be infinitely adjustable from a first gripping range, r1 (see, FIG. 3), to a second gripping range, r2 (see, FIG. 6).

FIGS. 3 and 4 illustrate within the docking station sub-assembly 24 the first hook member 30 arranged in a first gripping position. In the first gripping position, the docking space 34 has a minimum gripping range r1 defined between first finger members 36 of the first hook member 30 and the second hook member 32. FIGS. 3 and 4 illustrate that the second hook member 32 may translate linearly within a carriage 38 and relative to the first hook member 30 providing a first gripping range for the gripping space 34 with the first hook member 30 in the first gripping position from range r1 to range r3, where range r3 is less than range r2. To provide gripping pressure, a spring 40 (see, FIG. 7) biases the second hook member 32 toward the first hook member 30 to provide clamping pressure between the first hook member 30 and the second hook member 32 to securely dock an electronic device with the docking space 34.

FIGS. 5 and 6 illustrate the first hook member 30 in a second gripping position, which is different than the first gripping position of the first hook member 30. With the first hook member 30 in the second gripping position, the gripping space 34 has a minimum gripping range r4 defined between second finger members 42 and the second hook member 32. The gripping range r4 is greater than the gripping range r1, and may be less than or equal to the gripping range r3. FIG. 6 illustrates that the second hook member may translate linearly relative to the carriage 38 providing the gripping range r2. The spring 40 biases the second hook member 32 toward the first hook member 30 to provide clamping pressure between the first hook member 30 and the second hook member 32 to securely dock an electronic device with the docking space 34.

The second hook member 32 may also be moved, i.e., further translated relative to the first hook member 30, to a release position wherein the docking space is made greater than r1, r2, r3 or r4, as the case may be, to allow an electronic device to be placed into the docking station sub-assembly 24 and to remove the electronic device from the docking station sub-assembly 24. Moreover, it will be appreciated that the various configurations of the first hook member 30 and the second hook member 32 provide a substantially continuous gripping range from range r1 to range r2.

The first hook member 30 may be positioned on the docking station sub-assembly 24 in the first gripping position or the second gripping position to provide a docking space 34 having an infinitely adjustable gripping range from r1 to r2. In accordance with the herein described embodiments, the first hook member 30 may be rotated between the first gripping position and the second gripping position as indicated by the arrow "A" depicted in FIGS. 5 and 6. In this regard, the first hook member 30 may have a "Z"-like configuration, with the first finger members 36 extending in a first direction and the second finger members 42 extending in an opposite direction.

The first hook member 30 is provided with trunnions 44 that engage cylindrical supports 46 formed on the carriage 38. When rotated to the first gripping position, the docking space 34 is defined by the space between the finger members 36 and the second hook member 32. When rotated to the second gripping position, the docking space 34 is defined by the space between the finger members 42 and the second hook member 32.

Secure docking of an electronic device in the docking space 34 is further aided by the addition of foam/padding 48 added to the first hook member 30 and the second hook member 32. Padding 48 may be disposed on a first side 50 and a second side 52 of the first hook member 30. A suitable padding 48 may be a closed cell, adhesive backed foam, or other suitable foam.

Figure 7:
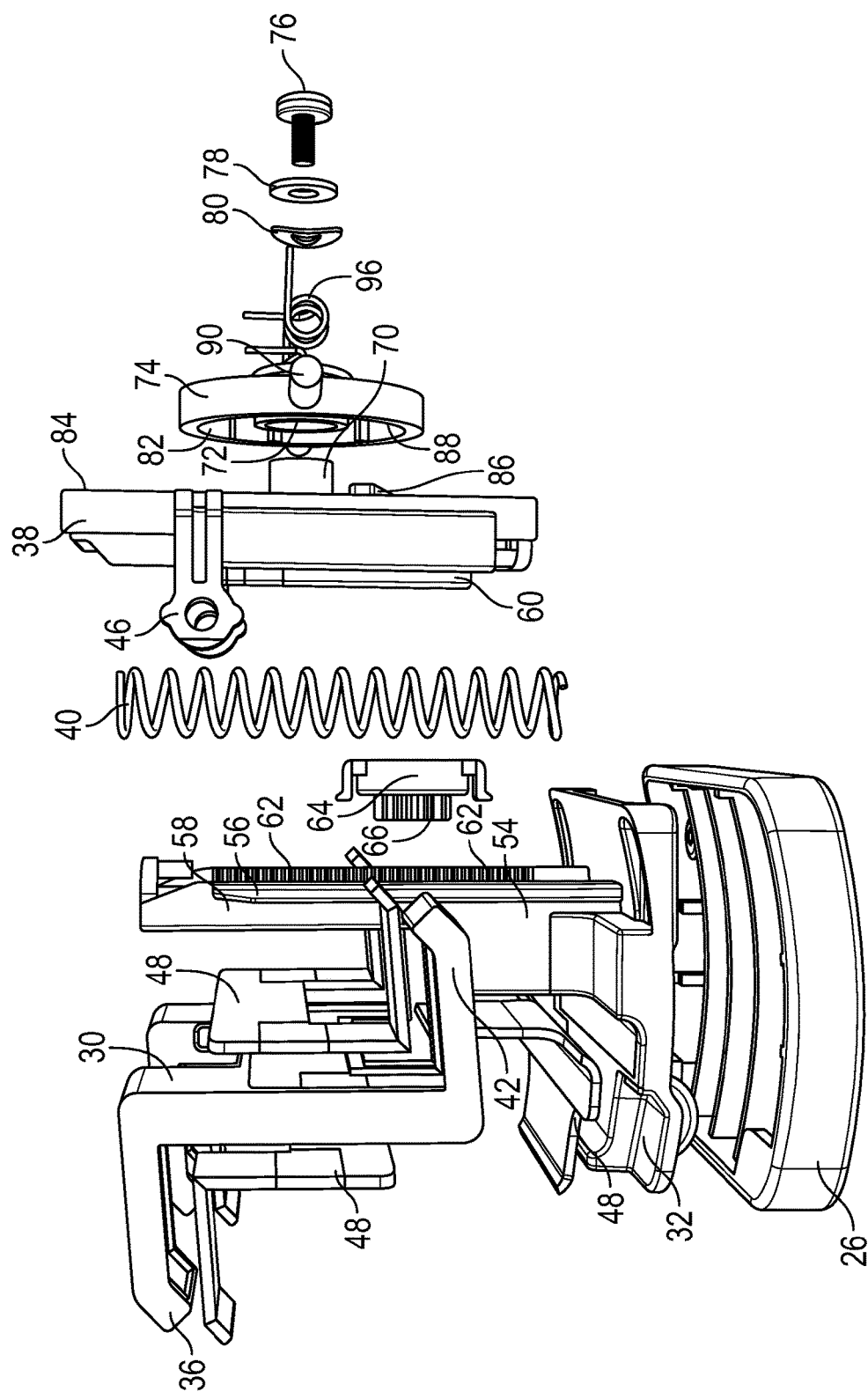
FIG. 7 is an expanded assembly view of a docking station sub-assembly of a stowable docking module in accordance with the herein described embodiments.
Figure 8:
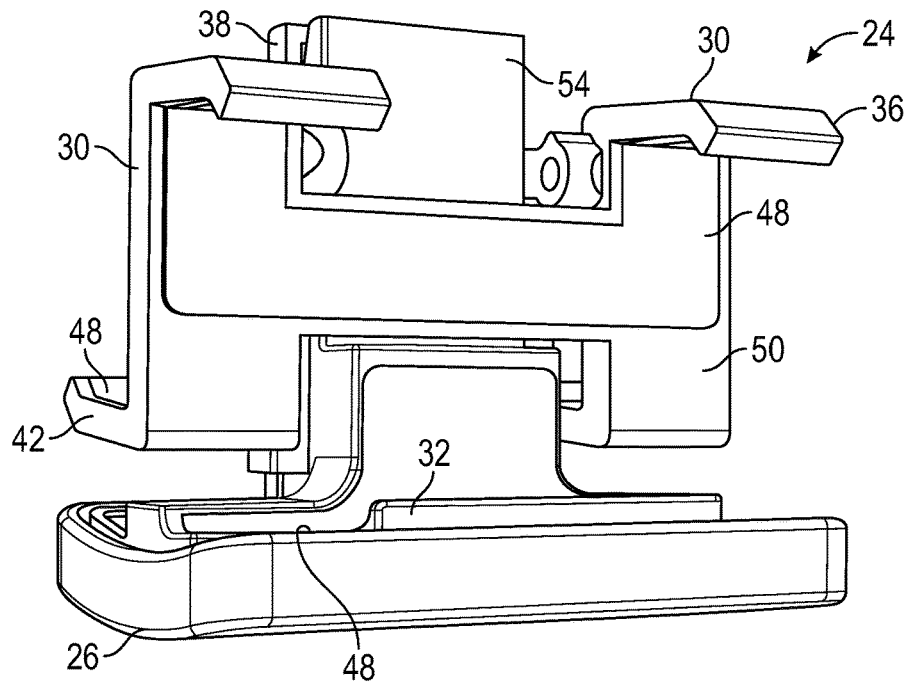
FIG. 8 is a front perspective view of the docking station sub-assembly shown in FIG. 7.
Figure 9:
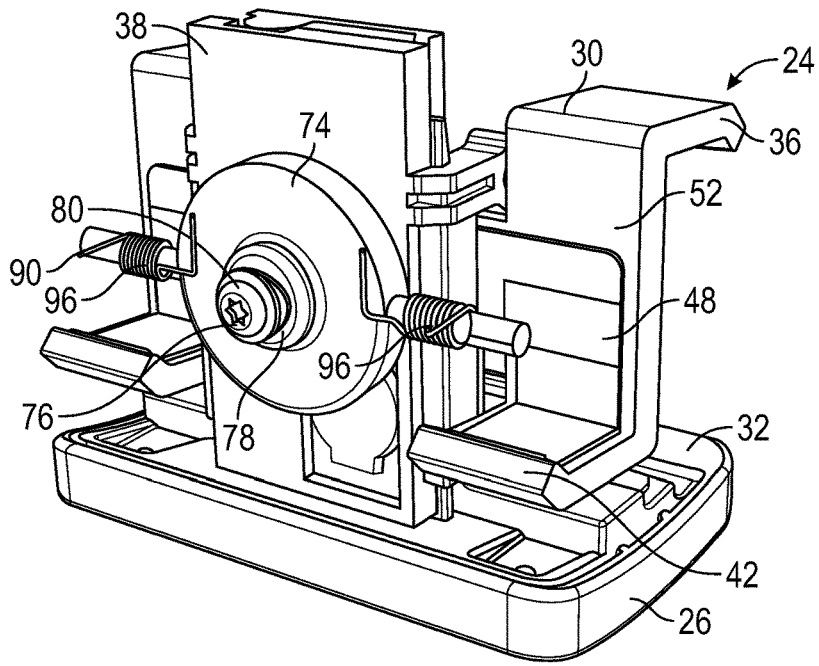
FIG. 9 is a rear perspective view of the docking station sub-assembly shown in FIG. 7.

FIGS. 7-9 illustrate additional structure of the docking station sub-assembly 24. The second hook member 32 includes a strut member 54 formed with flanges 56 on edges 58 thereof. The flanges 56 are adapted to be slidingly received with grooves 60 formed in the carriage 38. The sliding engagement of the flanges 56 with the grooves 60 allow the strut member 54 and hence the second hook member 32 to securely retained within yet translate relative to the carriage 38. The strut member 54 is further formed with a geared rack 62. A rotary damper 64 is secured to the carriage 38 and includes a cog 66 that engages the geared rack 62. The rotary damper 64 acts in a known manner to damp the linear motion of the second hook member 32 relative to the carriage 38 to provide a smooth, pleasant movement. Spring 40 is secured between the carriage 38 and the strut member 54 in manner to bias the second hook member 32 toward the first hook member 30, which as previously described is pivotably mounting to the carriage 38.

The carriage 38 is further formed with a cylindrical post 70 that extends through an aperture 72 formed in a rotary disk 74. A threaded fastener 76, washer 78 and spring washer 80 secure the rotary disk 74 to the carriage 38 such that a surface 82 thereof fractionally engages a surface 84 of the carriage 38. The carriage 38 may also include a cam 86 that is received within a groove 88 formed in the rotary disk 74. The cam 86 and the groove 88 cooperate to limit rotation of the carriage 38 relative to the rotary disk 74, which rotation is further damped by the frictional engagement of the surfaces 82 and 84.

Figure 10:
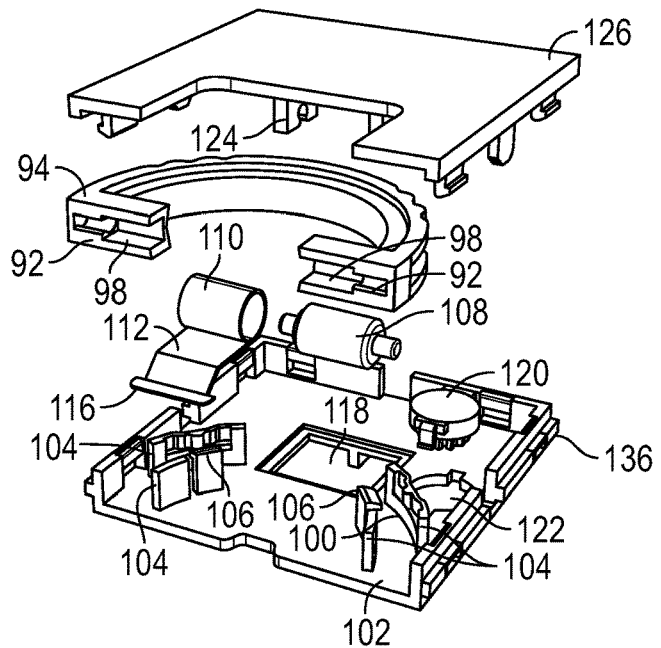
FIG. 10 is an expanded assembly view of a translation housing of a stowable docking module in accordance with the herein described embodiments.

The rotary disk 74 include pins 90. With reference to FIG. 10, the pins 90 are received within slots 92 of a tilt-pivot body 94 of the translation housing 22 and retained therein by friction or other snapping type engagement of the pins 90 with the slots 92. Torsion springs 96 engage the rotary disk 74 and the tilt-pivot body 94 to cause rotation of the docking station sub-assembly 24 as it is extended outwardly from the interior space 28 of the housing sub-assembly 12, such as shown in FIGS. 3-6. The slots 92 may be formed to include enlarged portions 98 to provide clearance for and to receive the torsion springs 96.

With continued reference to FIG. 10, the tilt-pivot body 94 has a semi-circular shape and is received within a channel 100 formed in a housing body member 102 by post structures 104. The post structures 104 may include flanges 106 that retain the tilt-pivot body 94 within the channel 100. Flanges 106 may also aid in controlling the position of the tilt-pivot body 94 within the formed channel 100 by interfacing with detent features on the face(s) of the tilt-pivot body 94

A roller 108 is received within a coil section 110 of a constant-force roller spring 112. The constant-froce roller spring 112 has an end 116 that is received within a slot 118 of the second housing portion 16. The uncoiling of the constant-force roller spring 112 and engagement of the roller 108 with tabs 124 of the housing cover member 126 provides an opening force to translate the translation housing 22 from the interior space 28 to deploy the docking station sub-assembly 24, and coiling of the roll spring 114 provides a pleasant resistance to a closing force applied to the translation housing 22 and/or the docking station sub-assembly upon moving the same to the stowed position (see, FIG. 1). A roller damper 120 is received within an aperture 122 formed in the housing body member 102, which engages geared rack 142 in the second housing portion 16 to damp the deploy/stow motion of the translation housing 22.

Figure 11:
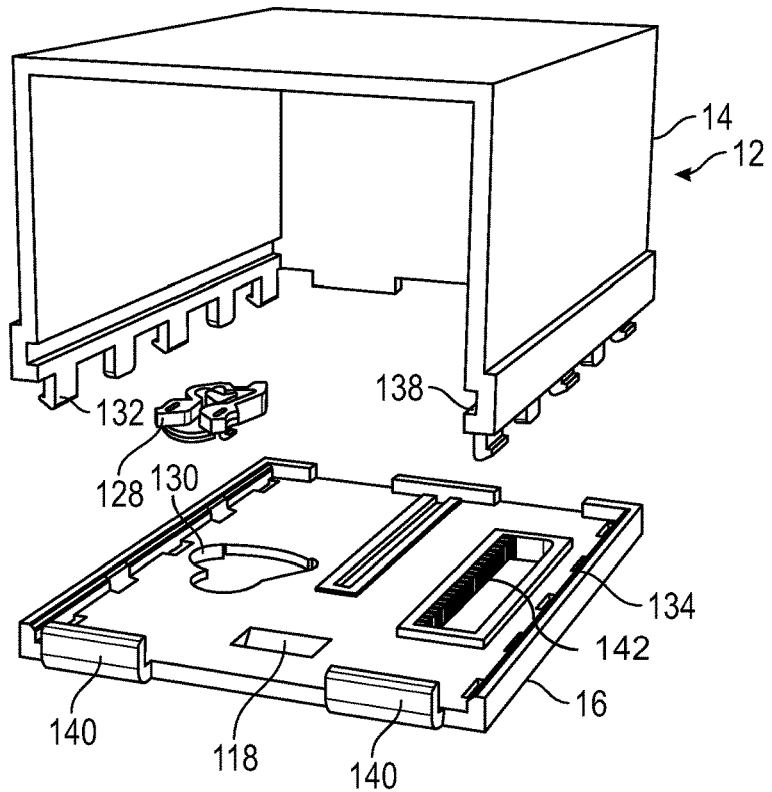
FIG. 11 is an expanded assembly view of a housing sub-assembly of a stowable docking module in accordance with the herein described embodiments.
Figure 12:
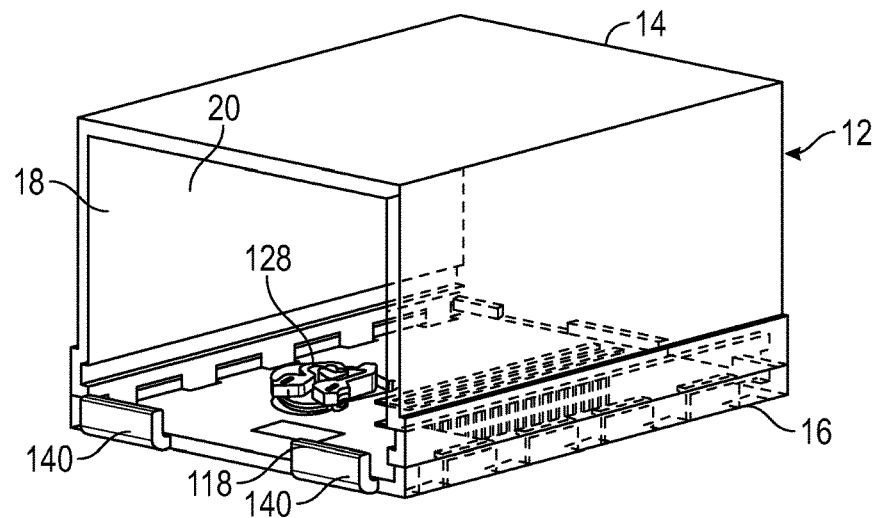
FIG. 12 is a perspective view of the housing sub-assembly illustrated in FIG. 11.
Figure 13:
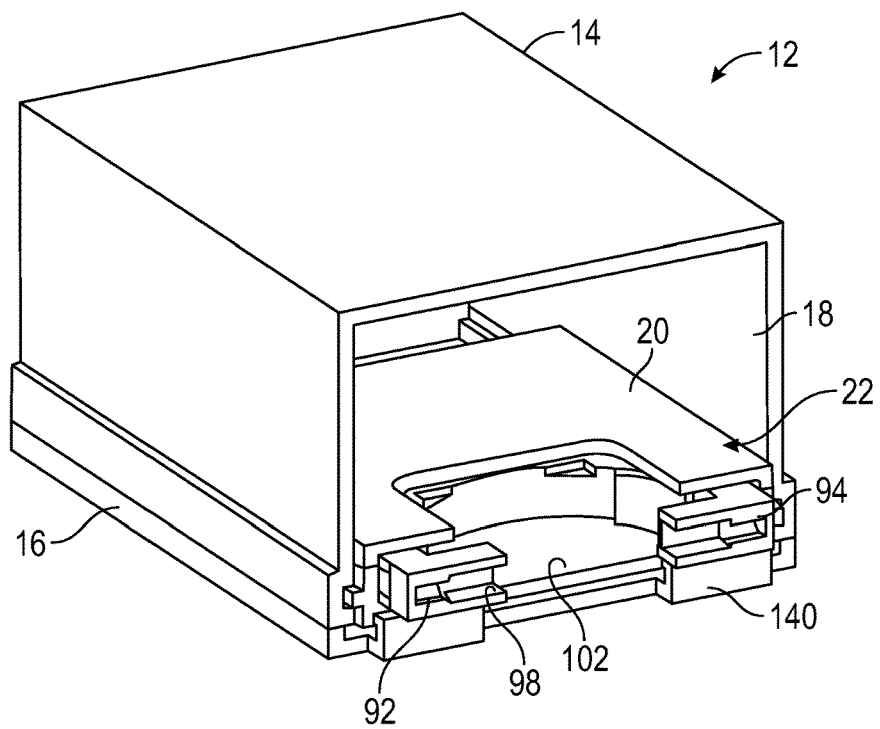
FIG. 13 is a perspective view of the translation housing of FIG. 10 assembled to the housing subassembly of FIGS. 11-12 in accordance with the herein described embodiments.

In FIGS. 11-13, further detail of the housing sub-assembly 12 is illustrated. The second housing member 16 includes an aperture 130, and a push-push latch 128 is disposed within the aperture 130. The push-push latch engages the translation housing 22 latching the translation housing 22 in the stowed position, and unlatching the translation housing 22 for deployment of the docking station sub-assembly 24 upon application of pressure to the panel 26 to release the push-push latch and upon the urging of the roll spring 112. The first housing member 14 may be secured to the second housing member by engagement of snap tabs 132 into slots 134, or by any suitable fastening including threaded fasteners. The translation housing 22 is disposed in the interior space 20 and is retained therein by engagement of flanges 140 with the housing body member 102 and by engagement of flanges 136 with grooves 138.

Figure 14:
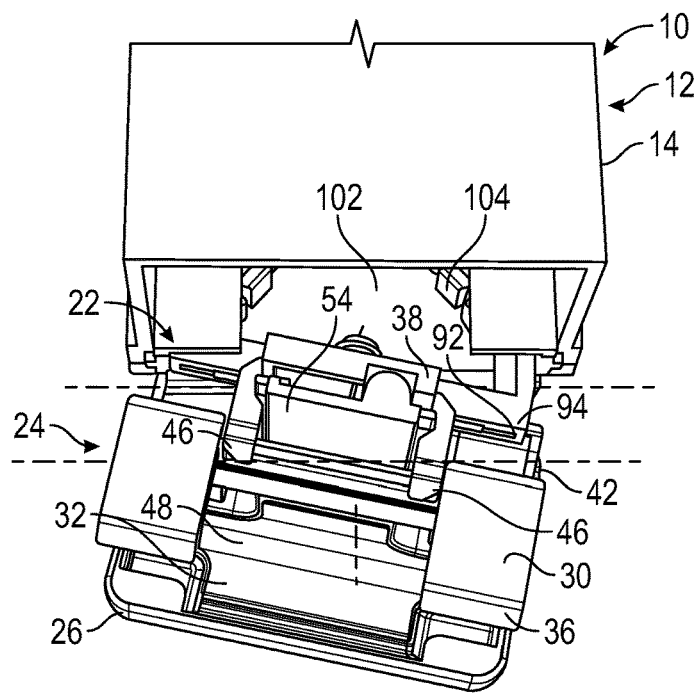
FIGS. 14-15 illustrate the stowable docking module of shown in FIGS. 1-6 further illustrating a yaw rotation of the docking station sub-assembly in accordance with the herein described embodiments.
Figure 15:
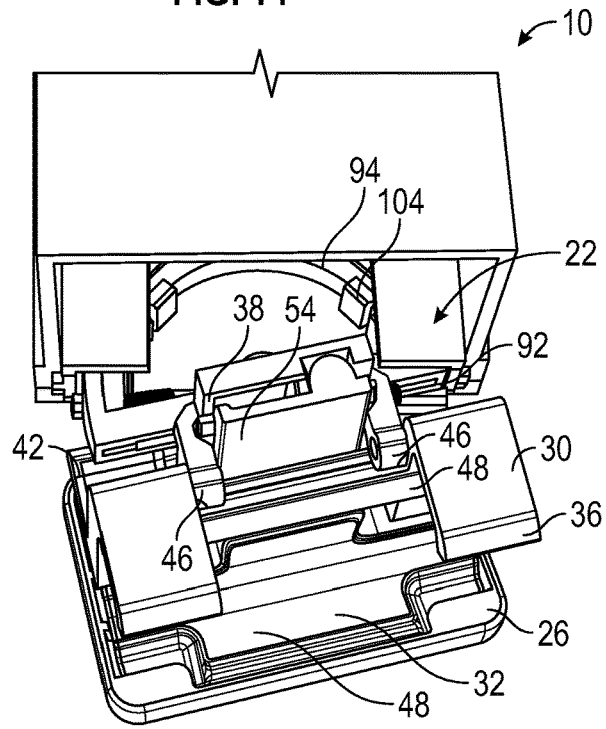

Further enhancing the functionality and flexibility of the stowable docking module 10, the docking station sub-assembly 24 may be pivoted about an axis, which is shown as a vertical axis in FIGS. 14 and 15 to illustrate the feature in a non-limiting manner. The carriage 38 being secured to the tilt-pivot body 94 by engagement of the pins 90 in the slots 92, the tilt-pivot body 94 may be rotated within the channel 100 formed in the housing body member 102 allowing the docking station sub-assembly 24 to be angled toward a vehicle operator or other occupant as the case may be. Furthermore, rotation of the pins 90 within the slots 92 allows the docking station sub-assembly to be tilted upwardly or downwardly, as depicted for illustration purposes in the drawings, to aid viewing of a docked electronic device. Still further, the docking station sub-assembly may be rotated about the post 70, with the frictional engagement of surfaces 82 and 84 retains the docking station sub-assembly 24 at a desired rotated position permitting operator to rotate their docked device from its initial docked orientation (i.e. landscape) to a second orientation (i.e. portrait).

A stowable docking module, such as the stowable docking module 10, in accordance with the herein described embodiments may be conveniently stowed, or deployed to secure an electronic device within a vehicle. The stowable docking module may furthermore accept electronic devices of a wide variety of widths or heights by providing a gripping range that is infinitely adjustable between a minimum range and a maximum range. When deployed, a docking station sub-assembly may be adjusted about at least three different axes to optimize a viewing angle to a stowed electronic device by an operator or other occupant of the vehicle.

In another non-limiting embodiment, a stowable docking module includes a translation housing received within a housing sub-assembly for translation between a first, stowed position and a second, deployed position. A docking station sub-assembly pivotably mounted to the translation housing so as to be pivotable between a stowed position when the translation housing is in the first, stowed position and a deployed position, different than the stowed position, when the translation housing is in the second, deployed position. A first hook member has first finger members and second finger members, extending in a direction opposite the first finger members, so as to form a "Z" shape. The first hook member is mounted on the docking station sub-assembly to be rotatable between a first gripping position and a second gripping position. A second hook member is secured to the docking station sub-assembly and arranged to oppose the first hook member. When the first hook member is in the first gripping position an electronic device may be docked in the stowable docking module by securing the device between the first finger members and the second hook member and when the first hook member is in the second gripping position an electronic device may be docked in the stowable docking module by securing the device between the first second finger members and the second hook member.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A stowable docking module comprising:
a translation housing received within a housing sub-assembly for translation between a first, stowed position and a second, deployed position;
a docking station sub-assembly pivotably mounted to the translation housing so as to be pivotable between a stowed position when the translation housing is in the first, stowed position and a deployed position, different than the stowed position, when the translation housing is in the second, deployed position;
a first hook member having a first gripping position and a second gripping position, the first hook member is pivotably mounted on the docking station sub-assembly and is pivotable between the first gripping position and the second gripping position;
a second hook member secured to the docking station sub-assembly and arranged to oppose the first hook member, wherein, an electronic device may be docked in the stowable docking module by securing the device between the first hook member and the second hook member; and wherein
in the first gripping position a first gripping range between the first hook member and the second hook member is provided, and in the second gripping position a second gripping range, different than the first gripping range, is provided between the first hook member and the second hook member.

2. The stowable docking module of claim 1, wherein the first gripping range has a minimum gripping range and the second gripping range has a maximum gripping range, and wherein, a gripping range of the docking station sub-assembly is continuous from the minimum gripping range to the maximum gripping range.

3. The stowable docking module of claim 1, wherein in the first gripping position a first gripping range is provided between the first hook member and the second hook member, the first gripping range being infinitely adjustable between a minimum gripping range and a maximum gripping range.

4. The stowable docking module of claim 1, wherein in the second gripping position a second gripping range is provided between the first hook member and the second hook member, the second gripping range being infinitely adjustable between a minimum gripping range and a maximum gripping range.

5. The stowable docking module of claim 1, wherein the first hook member comprises first finger members and second finger members, and wherein, in the first gripping position the first finger members oppose the second hook member, and in the second gripping position the second finger members oppose the second hook member.

6. The stowable docking module of claim 5, wherein the first finger members and the second finger members extend from the first hook member in opposing directions.

7. The stowable docking module of claim 5, wherein the first finger members and the second finger members form a "Z" configuration.

8. The stowable docking module of claim 1, wherein the second hook member is biased toward the first, gripping position and is movable to the second gripping position.

9. The stowable docking module of claim 1, wherein the docking station sub-assembly is mounted to the translation housing so as to be in the deployed position tiltable upwardly and downwardly.

10. The stowable docking module of claim 1, wherein the docking station sub-assembly is mounted to the translation housing so as to be in the deployed position pivotable from a first side to a second side.

11. The stowable docking module of claim 1, wherein the docking station sub-assembly is mounted to the translation housing so as to be in the deployed rotatable position.

12. A stowable docking module comprising:
a translation housing received within a housing sub-assembly for translation between a first, stowed position and a second, deployed position;
a docking station sub-assembly pivotably mounted to the translation housing so as to be pivotable between a stowed position when the translation housing is in the first, stowed position and a deployed position, different than the stowed position, when the translation housing is in the second, deployed position;
a first hook member having a first gripping position and a second gripping position, the first hook member is pivotably mounted on the docking station sub-assembly and is pivotable between the first gripping position and the second gripping position;
a second hook member secured to the docking station sub-assembly and arranged to oppose the first hook member, wherein, an electronic device may be docked in the stowable docking module by securing the device between the first hook member and the second hook member; and wherein
the first hook member includes first gripping fingers disposed at a first distance from an axis about which the first hook member may be pivoted between the first gripping position and the second gripping position and second gripping fingers disposed at a second distance, different from the first distance, from the axix such that in the first gripping position there is a first gripping range between the first gripping fingers and the second hook member, and in the second gripping position there is a second gripping range, different than the first gripping range, between the second gripping fingers and the second hook member.

13. The stowable docking module of claim 12, wherein the first gripping fingers and the second gripping fingers extend from the first hook member in opposing directions.

14. The stowable docking module of claim 12, wherein the first gripping fingers and the second gripping fingers form a "Z" configuration.

15. The stowable docking module of claim 12, wherein the second hook member is biased toward the first, gripping position and is movable to the second gripping position.

16. The stowable docking module of claim 12, wherein the docking station sub-assembly is mounted to the translation housing so as to be in the deployed position tiltable upwardly and downwardly.

17. The stowable docking module of claim 12, wherein the docking station sub-assembly is mounted to the translation housing so as to be in the deployed position pivotable from a first side to a second side.

18. The stowable docking module of claim 12, wherein the docking station sub-assembly is mounted to the translation housing so as to be in the deployed rotatable position.

* * * * *